(12) United States Patent  
Adams

(10) Patent No.: US 10,288,471 B2  
(45) Date of Patent: May 14, 2019

(54) PROCESS, APPLICATION AND SCALE TO BE USED IN THE MEASUREMENT OF THE AMOUNT HARVESTED ORGANIC PLANTS

(71) Applicant: Aaron Adams, Cave Junction, OR (US)

(72) Inventor: Aaron Adams, Cave Junction, OR (US)

( * ) Notice: Subject to any disclaimer, the term of this patent is extended or adjusted under 35 U.S.C. 154(b) by 161 days.

(21) Appl. No.: 15/255,101

(22) Filed: Sep. 1, 2016

(65) Prior Publication Data

US 2018/0058909 A1    Mar. 1, 2018

(51) Int. Cl.
*G01G 17/00* (2006.01)
*G01G 19/42* (2006.01)

(52) U.S. Cl.
CPC .............. *G01G 17/00* (2013.01); *G01G 19/42* (2013.01)

(58) Field of Classification Search
CPC ................................ G01G 17/00; G01G 19/42
See application file for complete search history.

(56) References Cited

U.S. PATENT DOCUMENTS

| | | | | |
|---|---|---|---|---|
| 4,969,112 A * | 11/1990 | Castle | ............... | G01G 19/025 177/136 |
| 5,361,061 A * | 11/1994 | Mays | ............... | G06F 15/0225 340/7.54 |
| 6,016,432 A * | 1/2000 | Stein | ............... | G11B 31/00 455/556.1 |
| 7,041,915 B2 * | 5/2006 | Kasinoff | ............ | G01G 19/4144 177/25.15 |
| 8,263,881 B2 * | 9/2012 | Oseko | .................... | G01G 19/44 177/25.13 |
| 9,123,214 B2 * | 9/2015 | Nishino | ............... | G07G 1/0072 |
| 2004/0026135 A1 * | 2/2004 | Huitt | ..................... | G01G 3/1408 177/210 R |
| 2004/0129461 A1 * | 7/2004 | Murdter | ............. | G01G 19/4144 177/25.13 |
| 2010/0084200 A1 * | 4/2010 | Juan-Castellanos | ... | G01G 19/40 177/25.15 |
| 2015/0107910 A1 * | 4/2015 | Villard | ............... | G01G 19/4146 177/25.12 |
| 2015/0294641 A1 * | 10/2015 | Jones | .................... | G06T 1/0007 345/520 |
| 2017/0184442 A1 * | 6/2017 | Satish | .................... | G01G 17/04 |
| 2018/0060938 A1 * | 3/2018 | Davis | ................. | G06Q 30/0633 |

* cited by examiner

*Primary Examiner* — Randy W Gibson

(74) *Attorney, Agent, or Firm* — Furr Law Firm; Jeffrey Furr, Esq.

(57) ABSTRACT

The current invention is a scale, process and software application. The scales communicate with each other via a wireless connection. The current invention allows grow operations to track their worker's (trimmers and pickers) productivity. It also allows the workers to see how much they are making, in real time. The scale and system allows that administrator to "see the productivity, put individuals in groups, and also see how much to pay each person at the end of the day or week.

10 Claims, 9 Drawing Sheets

PROCESS, APPLICATION AND SCALE TO BE USED IN THE MEASUREMENT OF THE AMOUNT HARVESTED ORGANIC PLANTS

CROSS-REFERENCES TO RELATED APPLICATIONS (IF ANY)

None

BACKGROUND

1. Field of the Invention

The present invention relates to a process, application and scale to measure and record the amount of harvested plants and more particularly associated with measuring output.

2. Description of Prior Art

There are a number of harvested product in which a worker or seller is sold on a unit basis which includes weight. These type of products could include such things as saffron stems, spices, and other precious material, which must be measured at an extremely accurate rate. These can also include marijuana as it has been legalized for both medical and recreational marijuana in many states and is a growing industry in the US. This industry recently registered approximately $2 billion in sales in the most recent year of data.

In the current marketplace for competing products, several digital scales were found to exist. These scales are developed for use in the cooking and other industries but do have carryover effects to growers but it is important to note that none of these competing products were seen to carry out the same calculations expected from the growers. Also these scales are not smart scales that keep track of a pickers or users work and cannot be used automatic to track output and amount earned.

There is still room for improvement in the art.

SUMMARY OF THE INVENTION

The current invention is a scale to record and measure the amount of harvested plants as well as a process and software application that works with the scale or a number of scales that communicate with each other via a wireless connection.

The invention allows grow operations to track their worker's (trimmers and pickers) productivity. It also allows the workers to see how much they are making, in real time. The scale and system allows that administrator to "see the productivity, put individuals in groups, and also see how much to pay each person at the end of the day or week.

It has a table top scale that also counts each bud and measure the weight. It will have a read out mode in grams or ounces. It will have a camera and image recognition to count buds or other desired part of the plant being harvested.

The scales and system can show growers the worker's productivity per strain and keep workers and growers accountable.

The innovative process is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

The current invention is a scale, process and software application that communicate with other scales via a wireless connection.

The current invention allows grow operations to track their worker's such as trimmers and pickers productivity. It also allows the workers to see how much they are making, in real time. The scale and system allows that administrator to "see the productivity, put individuals in groups, and also see how much to pay each person at the end of the day or week.

Figure 1:
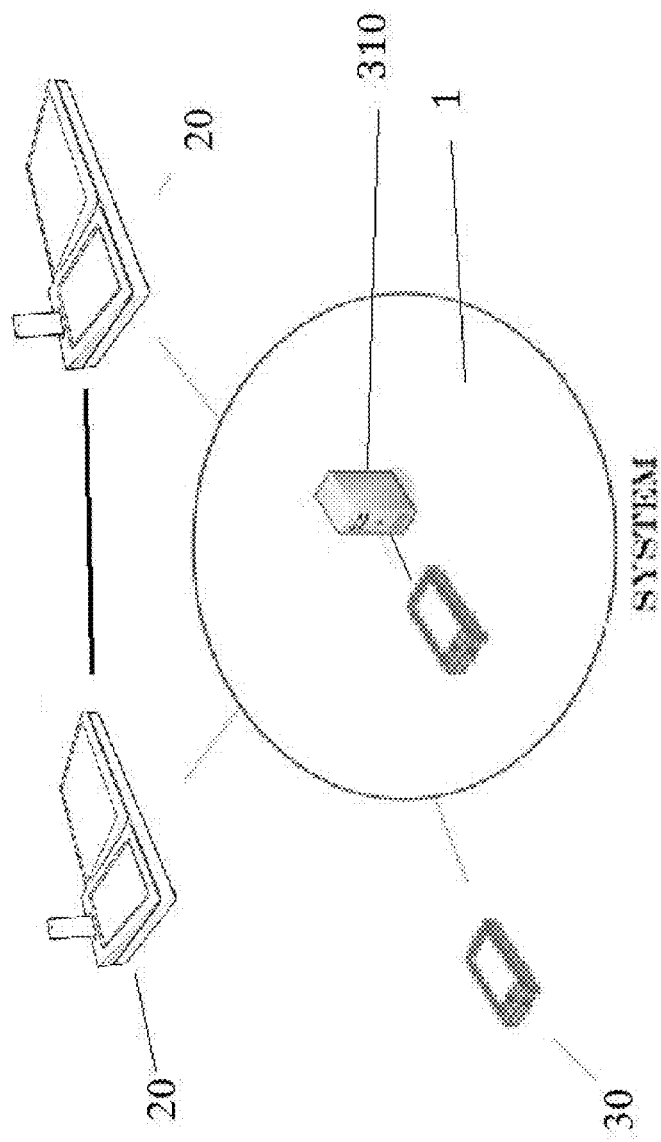
FIG. 1 shows an overview of how Users access the system.
Figure 2:
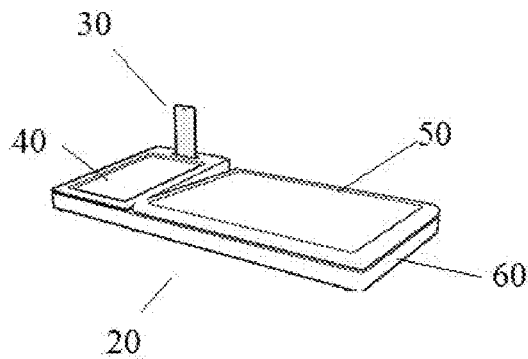
FIG. 2 shows a front right perspective view of the scale.
Figure 3:
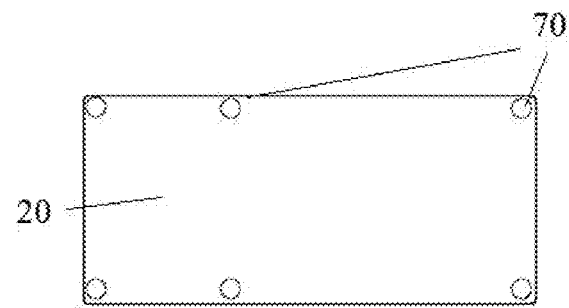
FIG. 3 shows a bottom view of the scale.
Figure 4:
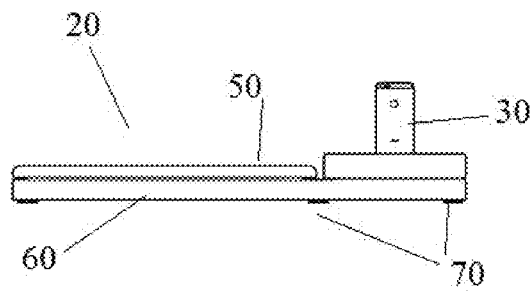
FIG. 4 displays a back view of the scale.
Figure 5:
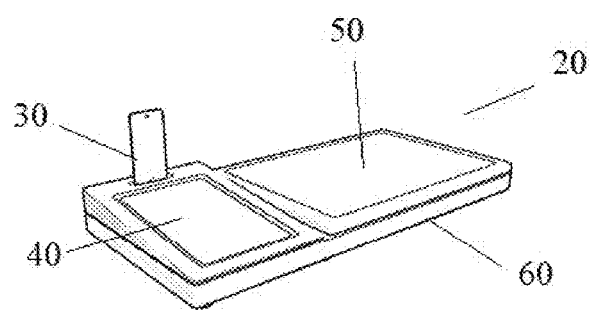
FIG. 5 displays a front left perspective view of the scale.
Figure 6:
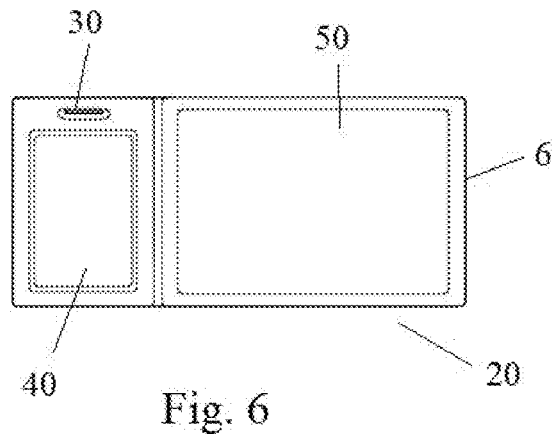
FIG. 6 displays a top view of the scale.
Figure 7:
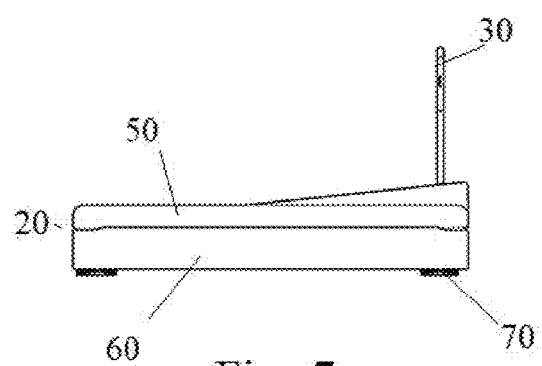
FIG. 7 shows a right side view of the scale.
Figure 8:
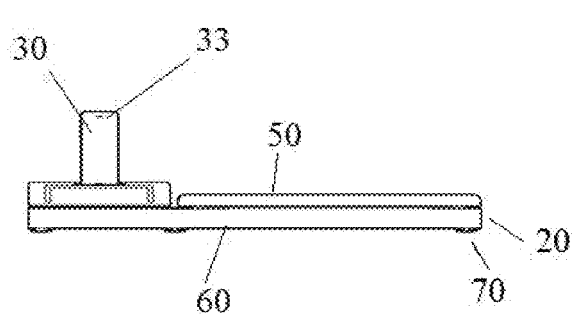
FIG. 8A displays a left side view of the scale using the camera from a smartphone.
FIG. 8B displays a left side view of the scale using an attached camera.
Figure 8:
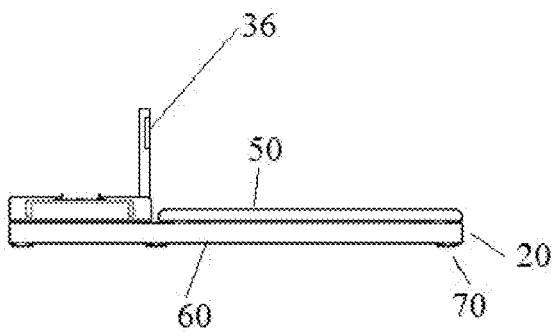
Figure 9:
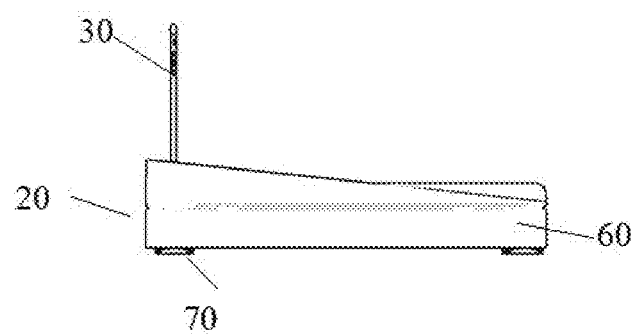
FIG. 9 displays a back view of the scale.

FIG. 1 displays the preferred embodiment of the system architecture 1 accessed through a Bluetooth connection, wireless connection an Internet, Intranet and/or Wireless network 500. However, the system could be implemented on a device-to-device or client/server architecture as well.

In FIG. 1, the system 1 is accessed from a user's scale 20 or computing device 30 through a web browser over HTTP and/or HTTPS protocols 500 or wireless network or cell phone to cell phone connection. A computing device 30, such as a cell phone, that can access the system 1 must have some version of a CPU, CPU memory, local hard disk, keyboard/keypad/input and display unit. The scales 20 can be designed to be a standalone computer device or connected to any desktop, laptop, tablet, smart phone or general purpose computing device with an appropriate amount of memory suitable for this purpose and an active connection to the Internet 500. Computing devices like this are well known in the art and are not pertinent to the invention.

The system 1, data and processing code can reside in the non-transitory memory 310 of the one or more computing devices. The system 1 in the preferred embodiment would be written to act like a smart phone application (app).

The Scale

As shown in FIG. 2-9, The scale 20 is uniquely designed. It has a scale platform 50 that sits on a base 60. It is a table top scale that also counts each bud and measure the weight. It will have a read out mode in grams or ounces. The scale platform 50 is connected to the weighing means which will weigh the product placed on the scale platform 50. In the preferred embodiment, the scale itself is a digital scale.

On one side of the top of the scale 20 sits a monitor 40 with touch screen input capabilities. The monitor 40 is a flat screen that will allow input into the scale 20 as well as displaying the results of the scale including weight and the number of buds or other countable measurable factor desired by the producer of the agricultural product. The weight will be read from the output of the weighing means based on the product on the scale platform 50.

The scale 20 can have its own wireless device or it can use a smart phone 30 or any computing or wireless device which serves in that function. In the preferred embodiment, there is a slot on the back top of the scale 20 into which the smart phone or device 30 is place.

The scale 20 can communicate with other scales 20 or to a master server which can be another scale 20 or a smartphone 30 or any type of computing device. The communication would include data about each grower, trimmer or picker and sum the total regardless which scale 20 is used.

In the preferred embodiment, as shown in FIG. 1, the data gathered from the scales and the system will be stored in a process database 310. This can be at a master server or a master scale 20 or a master computing device 10. The data is stored there after it has been sent by the other scales 20 and computing devices 10 in the system. In another embodiment, each scale 20 can store a copy of the master database 310.

It is this database 310 that will store the information collected and distribute it to the users, such as the growers and employees as a function of the trim tracker system. Letting them know how they or their workers are performing.

The scale 20 will have a camera 36 and image recognition to count buds or other desired part of the plant being harvested. The camera 36 will serve as a counting mechanism. The scale 20 will use a HD Mini Camera 36, as shown in FIG. 8B, for the Counting with the software programmed to recognized the product such as buds or other items. The scale 20 may use the camera 33 in the smartphone 30 or smart device as shown in FIG. 8A.

Operation

The system 1 is designed to be used like a smart phone computer application or app. The data and processing code can reside in the non-transitory memory 310 of the one or more computing devices.

Figure 10:
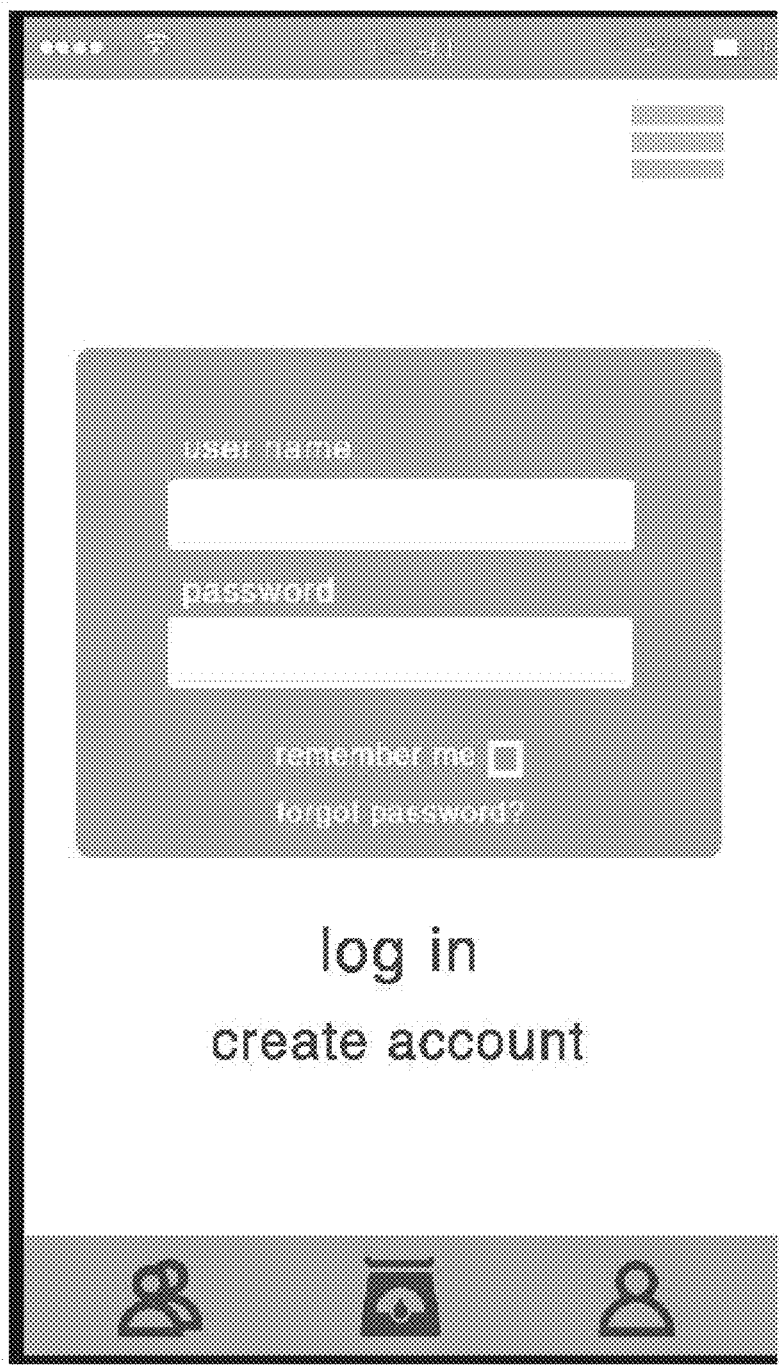
FIG. 10 shows a sample of a login screen.

A user would log on to the system 1 using a login and password as shown in FIG. 10.

Figure 11:
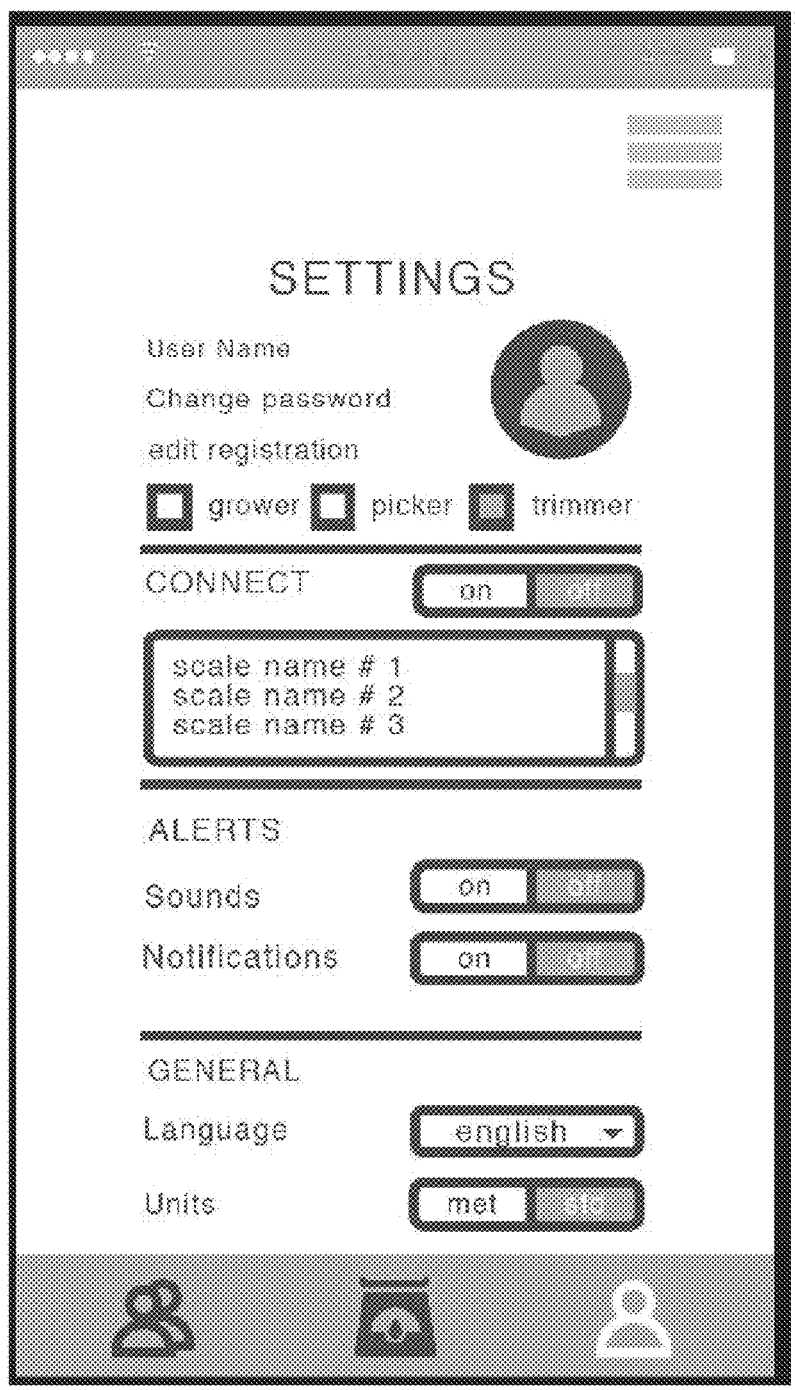
FIG. 11 shows a sample of a profile/settings screen.

As shown with the screenshots in FIG. 11, in the preferred embodiment, there are three different user bases with a picker, grower, or a trimmer as the options within initial registry. In additional embodiments, other user bases can be set. The individual's role may be edited through their profile settings, after which a confirmation pop up will make sure that a role was not changed in error. In one embodiment, there may need a confirmation on the selected roles. The user may also confirm and edit any personal information. It will also show which scales the user is set for use or has used. It will set the language preference and units of measure. The scales 20 may use one or more different languages and will translate the data when needed.

Figure 12:
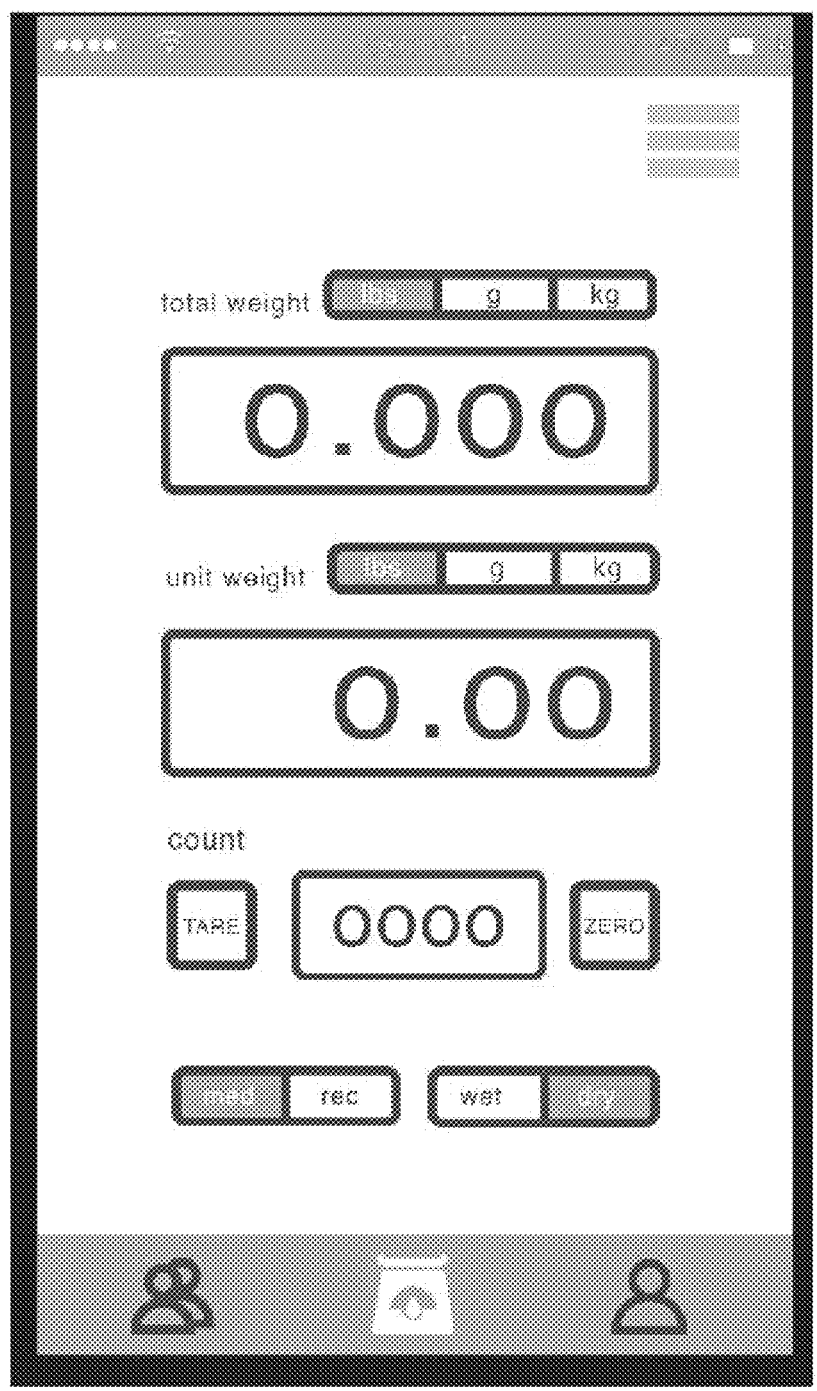
FIG. 12 shows a sample measurement screen.

The system 1 will have a scale 20 result screen as shown in FIG. 12. It shows the total weight and the unit weight of the product. It also shows unit count based on the image recognition to count buds or other desired part of the plant being harvested. It is signifies whether to product is wet or dry while being weighed.

Figure 13:
FIG. 13 shows a results profiles screen.
Figure 14:
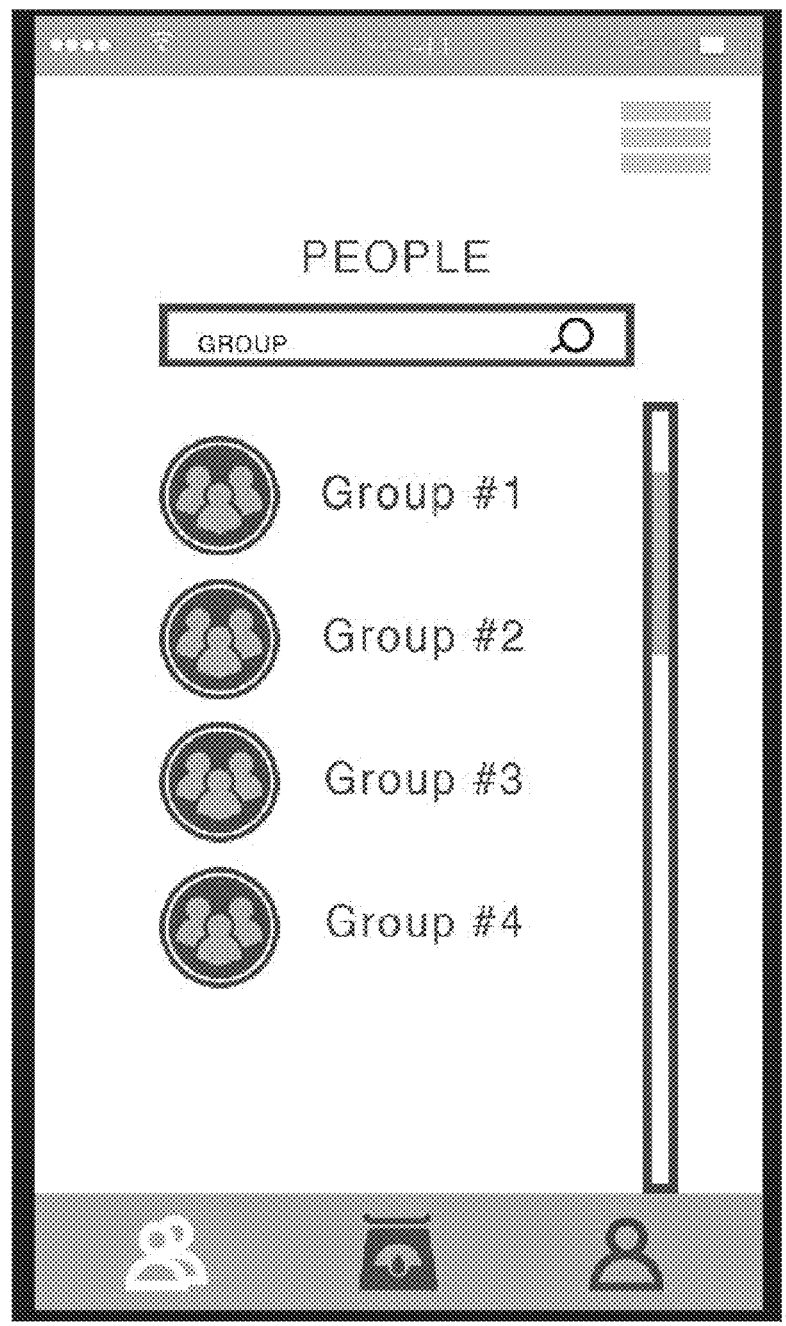
FIG. 14 shows a sample group.

The Profile screen as shown in FIG. 13 is a screen for individuals and uses to track their own progress and compare to others. Within settings there is a manual sync option for bluetooth as well as internal iOS and android settings for bluetooth with auto sync when powered on and in range. The system 1 will be able to let the system know every time they reach a certain weight The system 1 can group workers and users of the system into groups as shown in FIG. 14. The group aspect is similar to the personal profile on a larger scale, allowing for teams of people to evaluate themselves and possibly add a friendly competition in the future between teams. The group function would also allow supervisors to keep tabs on workflow and productivity. The data for this process is stored in the database 310 and is summarized by the system and sent to the supervisors.

Figure 15:
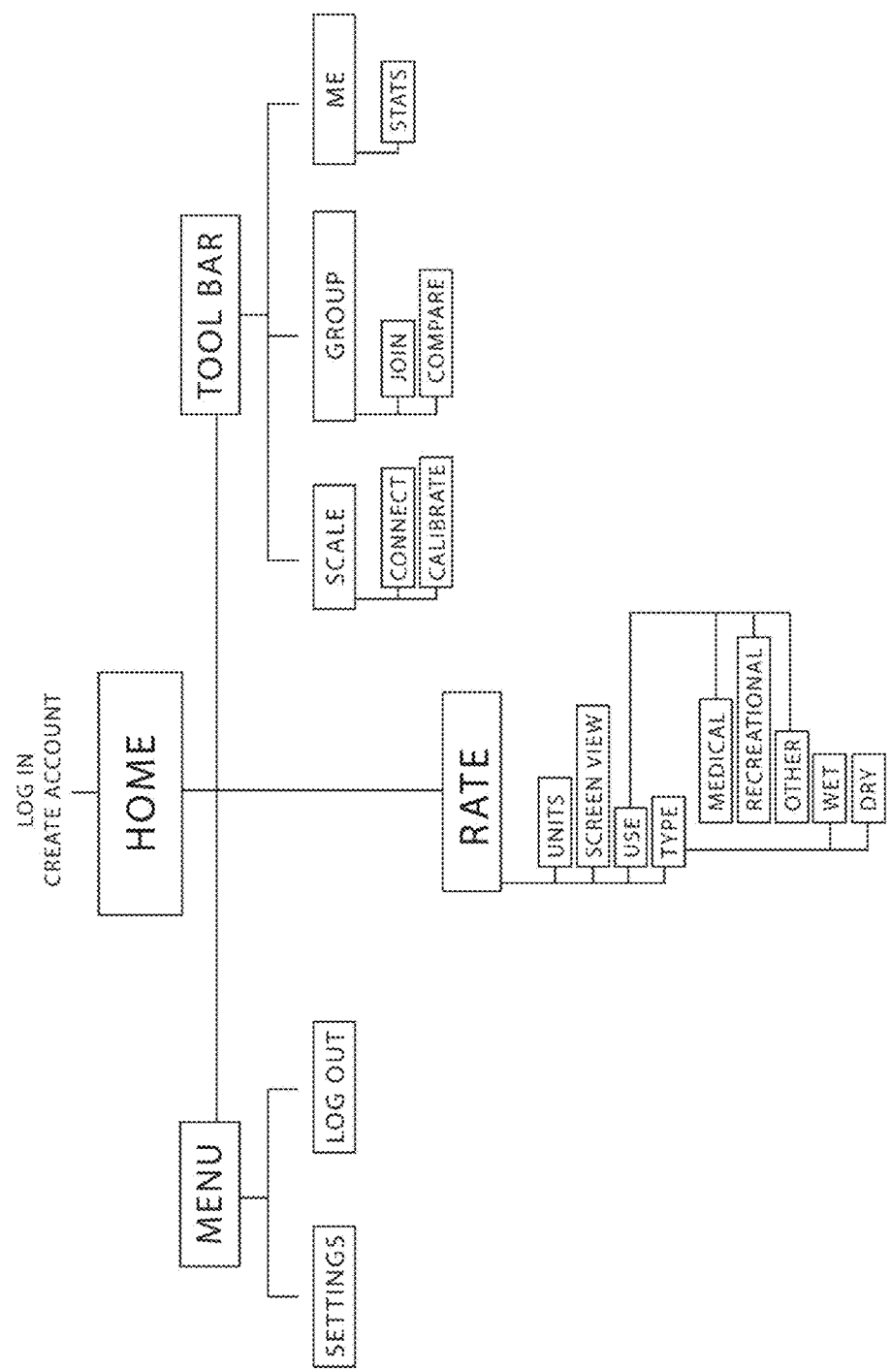
FIG. 15 display a system component diagram.

FIG. 15 shows a flow diagram of the system 1. It starts out with a log in and home screen. There is menu for settings or logging out. There is a rate setting to set the rate where units, use, type and screen view. The type is wet or dry. The use includes recreational, medical, and other. The system 1 will have a toolbar function with functions for scale, group and personal. The scale function will calibrate and set connections for the scale. The group function will allow to have people join and/or compare groups. It can set and show personal stats.

Advantages

The invention allows grow operations to track their worker's (trimmers and pickers) productivity. It also allows the workers to see how much they are making, in real time. The scale and system allows that administrator to "see the productivity, put individuals in groups, and also see how much to pay each person at the end of the day or week.

The scales and system can show growers the trimmers productivity per strain and keep workers and growers accountable. For example, a trimmer gets paid $150 a pound. the simple math is $150 divided by 456 grams/lbs the trimmer would make 0.3289473684 or 33 cents a gram rounded and based on long it took to trim 456 grams will give the hourly wage.

CONCLUSION

Although the present invention has been described in considerable detail with reference to certain preferred versions thereof, other versions are possible. Therefore, the point and scope of the appended claims should not be limited to the description of the preferred versions contained herein. The system is not limited to any particular programming language, computer platform or architecture.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A scale comprising;
having a base with a top and an bottom with weighing platform on the top of said base connected to a digital scale with a monitor attached to said base, a camera, a computing device and a wireless communication device where the computing device uses the camera to recognize and count specific product, where the digital scale weighs the product, where the computing device sends and receives communication to one or more other computing devices and associating the weigh and volume to a specific user to produce data; where the computing device is a smartphone, and the scale has a slot into which the smartphone is placed.

2. A scale according to claim 1 having the computing device provide the camera.

3. A scale according to claim 1 using the data to generate production results.

4. A scale according to claim 3 using the results to calculate compensation.

5. A system to measure harvesting of organic plants comprising;
having a system that resides in the non-transitory memory of a computing device;
having a scale with a base with a top and an bottom with weighing platform on the top of said base connected to a digital scale with a monitor attached to said base, a camera, a wireless communication means and a computing device;
having software using the camera to recognize and count specific product;
having a plurality of users defined in the system;
using the scale to weigh the weight and count specific product;
associating the weigh and volume to a specific user to produce data;
using the data to generate production results;
communicating the data to one or more computing devices; and
using the results to calculate compensation; where the computing device is a smartphone, and the scale has a slot into which the smartphone is placed.

6. A system according to claim 5 having the computing device be detachable.

7. A system according to claim 6 having the computing device provide the camera.

8. A system according to claim 5 having the user have one or more user bases.

9. A system according to claim 5 grouping the users into groups.

10. A system according to claim 5 where the user can track their progress.

* * * * *